(12) United States Patent
Eleftheriou et al.

(10) Patent No.: US 8,977,894 B2
(45) Date of Patent: Mar. 10, 2015

(54) OPERATING A DATA STORAGE SYSTEM

(75) Inventors: Evangelos Stavros Eleftheriou, Zurich (CH); Robert Haas, Zurich (CH); Xiao-Yu Hu, Zurich (CH); Ilias Iliadis, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/387,740

(22) PCT Filed: Aug. 5, 2010

(86) PCT No.: PCT/IB2010/053544
§ 371 (c)(1),
(2), (4) Date: Jan. 29, 2012

(87) PCT Pub. No.: WO2011/021126
PCT Pub. Date: Feb. 24, 2011

(65) Prior Publication Data
US 2012/0131381 A1 May 24, 2012

(30) Foreign Application Priority Data
Aug. 21, 2009 (EP) .................................. 09168424

(51) Int. Cl.
*G06F 11/00* (2006.01)
*G06F 3/06* (2006.01)
*G06F 12/02* (2006.01)

(52) U.S. Cl.
CPC ............ *G06F 3/0647* (2013.01); *G06F 3/0616* (2013.01); *G06F 3/0688* (2013.01); *G06F 12/0246* (2013.01); *G06F 2212/7208* (2013.01); *G06F 2212/7211* (2013.01)
USPC ........................................................ 714/6.32

(58) Field of Classification Search
USPC ................................. 714/6.32, 6.13, 6.3, 6.31
See application file for complete search history.

(56) References Cited

U.S. PATENT DOCUMENTS

| | | | | |
|---|---|---|---|---|
| 2002/0199129 A1* | 12/2002 | Bohrer et al. | ...................... | 714/7 |
| 2004/0250161 A1* | 12/2004 | Patterson | .......................... | 714/6 |
| 2005/0166084 A1* | 7/2005 | Yagisawa et al. | ................. | 714/6 |
| 2006/0224914 A1* | 10/2006 | Blaum et al. | ...................... | 714/6 |
| 2008/0094811 A1 | 4/2008 | Hazelzet | | |
| 2008/0098158 A1* | 4/2008 | Kitahara | ....................... | 711/103 |

(Continued)

FOREIGN PATENT DOCUMENTS

| | | | | |
|---|---|---|---|---|
| CN | 101281481 | 10/2008 | | |
| CN | 101436149 | 5/2009 | | |
| EP | 1 840 722 A2 | 10/2007 | ................ | G06F 3/06 |

OTHER PUBLICATIONS

International Search Report for PCT Application PCT/IB2010/053544, mailed Nov. 3, 2010, 3 pages.

(Continued)

*Primary Examiner* — Yolanda L Wilson
(74) *Attorney, Agent, or Firm* — VanLeeuwen & VanLeeuwen; William J. Stock

(57) ABSTRACT

A data storage system including at least one memory device array including memory devices for storing data; and a storage subsystem controller for performing a method for operating the memory devices within the memory device array by relocating parity entities from a first memory device to a spare memory device replacing a failed memory device, and by storing one or more of reconstructed data entities on the first memory device.

24 Claims, 3 Drawing Sheets

(56) References Cited

U.S. PATENT DOCUMENTS

| | | | |
|---|---|---|---|
| 2008/0140918 A1* | 6/2008 | Sutardja | 711/103 |
| 2008/0189477 A1* | 8/2008 | Asano et al. | 711/103 |
| 2009/0077302 A1* | 3/2009 | Fukuda | 711/103 |
| 2009/0113237 A1* | 4/2009 | Ito et al. | 714/7 |
| 2009/0172335 A1 | 7/2009 | Kulkarni et al. | 711/170 |
| 2009/0319743 A1* | 12/2009 | Ash et al. | 711/165 |
| 2010/0115183 A1* | 5/2010 | Araki et al. | 711/103 |
| 2012/0084600 A1* | 4/2012 | Kidney et al. | 714/6.13 |

OTHER PUBLICATIONS

Written Opinion for PCT Application PCT/IB2010/053544, mailed Nov. 4, 2010, 6 pages.

* cited by examiner

OPERATING A DATA STORAGE SYSTEM

BACKGROUND

The invention relates to a method and system for operating memory devices, in particular solid state drives (SSD) of a data storage system, in particular a RAID (Redundant Array of Inexpensive Discs)-protected data storage system.

RAID is a data storage system primarily known in connection with a plurality of hard disk drives in which data is spread over multiple hard disc drives with or without introducing redundancy for data protection. There are different RAID architectures indicated by a number such as RAID0, RAID1, RAID2, etc. having different designs to increase data reliability and input/output performance. A RAID array of hard disc drives distributes data across multiple discs, however the disc array is seen by a computer or server connected to this array virtually as one single storage device. Accordingly RAID combines two or more physical hard disc drives into a single storage device by using either special hardware or software.

There may be different concepts embodied in a RAID system, in particular mirroring, striping and error correction. Mirroring includes copying of data to more than one hard disc. Striping of data includes splitting of data across more than one disc of the array. For error correction purposes redundant data is stored to allow errors to be detected and possibly corrected. Different RAID level architectures use one or more of these techniques depending on the requirements to increase data reliability or input/output performance of the storage system. The RAID data storage system is designed to improve reliability and availability of data ensuring that important data is available or to improve the access speed to data files, for example in a data storage system that delivers a large number of transactions for bank/trade's database system or video on demand programs to many viewers or customers.

The configuration of a RAID data storage system affects reliability and performance in different ways. By using more than one disc it is more likely that one disc will fail. This is addressed by using error checking so that the total data storage system can be made more reliable. Striping can be used to increase performance because it allows sequences of data to be read from multiple discs at the same time. Error checking typically slows down the data storage system as data needs to be read from several storage places and be compared with each other, but error checking increases the reliability and enables to provide a repair mechanism in case that one or several discs fail.

In a RAID 5 data storage architecture parity entities are distributed over different hard discs to increase performance. The distributed parity entity requires all drives or hard discs but one to be operative. If a drive failure occurs any subsequent read operations are calculated from the distributed parity entity such that the drive failure is masked from the user.

RAID 6 architectures provide a fail tolerance of two drive failures, i.e. the array continues to operate with up to two failed drives. A dual parity gives time to rebuild the array without being at risk that a further drive failure occurs before a rebuilt is complete.

In a conventional RAID storage system when there is a disk failure, a spare disk is used to rebuild the missing data. In a conventional RAID data storage system the spare disk which replaces a failed disk is used in the same manner as the remaining still operative disks of the data storage system.

A memory device can be embodied as flash device such as flash based solid state drive SSD or a flash based module which can store user data. Such solid state based non-volatile memory devices are faced with an endurance challenge. Endurance can be defined at the maximum number or writes/erases cycles that can be performed on each data block before it wears out. Wear leveling is a known technique for prolonging the service life of an erasable computer storage media such as a flash memory. In wear leveling, the write operations are distributed equally on blocks or devices of the storage space. Wear leveling is typically performed by a flash device controller based on a physical block address PBA.

SUMMARY

According to an embodiment of the invention there is provided a method for operating memory devices of a data storage system, the method including relocating one or more parity entities from a first memory device to a spare memory device replacing a failed memory device, and storing one or more reconstructed data entities on the first memory device.

According to another embodiment of the invention there is provided a data storage system including memory devices or for storing data, and a storage subsystem controller designed for performing operating the memory devices by relocating one or more parity entities from a first memory device to a spare memory device replacing a failed memory device, and for storing one or more reconstructed data entities on the first memory device.

According to another embodiment of the invention, there is provided a computer program element including computer readable instructions for performing a method according to any one of the methods as described above. Such computer program element might be stored on a data carrier.

Preferred features of the method shall be considered as disclosed preferred features of the system, too, and vice versa.

BRIEF DESCRIPTION OF THE DRAWINGS

In the following embodiments of the method for operating a data storage system, and a data storage system are described in more detail with reference to the enclosed figures.

DETAILED DESCRIPTION

Figure 1:
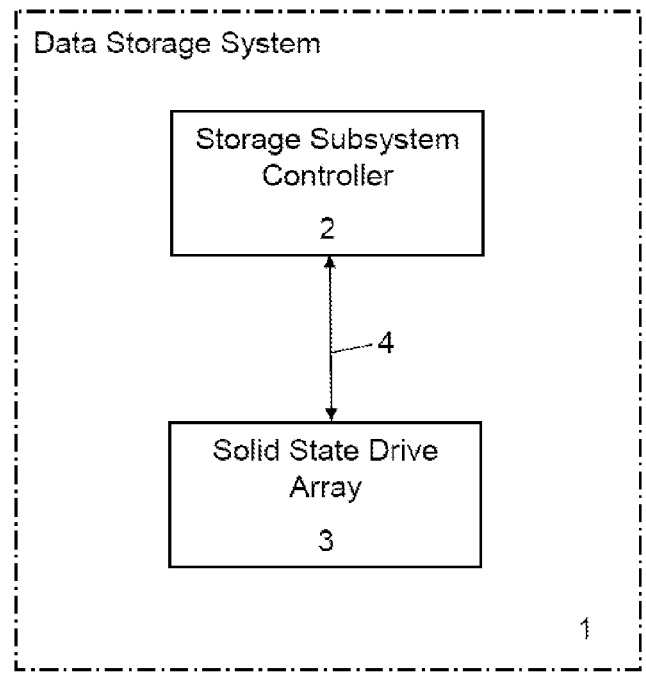
FIG. 1 shows an embodiment of a data storage system according to the present invention.

In one embodiment, the method aims to provide a wear leveling method and exploits the fact that the installed spare memory device replacing a failed memory device typically is not yet worn out, i.e. has not suffered from write cycles yet. Hence, the newly installed spare memory device represents an ideal medium for relocating a portion or all of the frequently updated parity entities PE to. This provides relief to the remaining memory devices of the data storage system as their rate of wear out is reduced. Consequently, this improves the reliability and increases the life time of the entire data storage system.

Preferably, the method provides a wear leveling scheme within a RAID (Redundant Array of Inexpensive Disks) data storage system which may be performed on the logical block array (LBA) and can therefore be combined with wear leveling at the device level in order to exploit the spare memory device more intensively and to prevent the remaining memory devices from additional excessive wear.

The memory device from which the one or more parity entities are taken for relocation to the spare memory device preferably is one of the remaining memory devices, i.e. any one of the memory devices except of the failed one. It can be envisaged to relocate only one or few of parity entities from such device, it can also be envisaged that all parity entities of this first memory device will be relocated. Thus, the wear out of this first memory device will be reduced for the future which results in an increase of the life time and reliability of the entire data storage system.

In a preferred embodiment, a certain amount of parity sectors or parity entities PE which are frequently updated compared to data entities or data sectors are progressively removed from the remaining (in terms of wear out) older memory devices and placed on the newly installed (in terms of wear out) younger spare memory device. The selection of the parity entities to be relocated may depend on a flagging mechanism indicating the parity entities with the highest wear out rate being relocated first.

In a preferred embodiment, one, few or even all parity entities from one, few or even all remaining memory devices are relocated to the spare memory device. The relocation action can be implemented upon replacement of the failed memory device by the spare device, or can be implemented later on.

In an embodiment of the present method, the relocation of parity entities PE to the spare memory device is performed when a predetermined relocation criterion is met. The relocation criterion may take into account a relative age of the memory devices of the data storage system wherein the relative age of a memory device is determined by a ratio between an age counter which is incremented upon each write operation on the respective memory device and an expected life time of said memory device. The relocation criterion may directly depend on the relative ages as determined, or may indirectly depend thereon.

In a possible embodiment, data to be stored on the data storage system is split into groups of data entities. Each group of data entities preferably includes multiple data entities stored on different memory devices. Preferably, with a given number of N memory devices, a group of data entities includes N−1 data entities, each data entity being stored on a different one of the memory devices. A data entity can be represented by any specific and applicable unit of information stored, such as a bit, a byte, a word, a page, a block, etc. and for sure may include codings other than binary.

Preferably, at least one parity entity PE is calculated for each group of data entities and is stored on a memory device of said data storage system, preferably on a memory device which does not store any data entities associated to the respective group of data entities. In the above example, if N−1 memory devices carry the data entities of a group, the N'th memory device may carry the corresponding parity entity. Preferably, the parity entity associated to a group of data entities is calculated performing a bitwise XOR-operation on the data entities of said group of data entities. According to an alternative embodiment, the parity entities for a group of data entities are calculated by performing Galois field operations on the data entities of said group of data entities.

Preferably, upon failure of one of the memory devices a spare memory device reserved for this purpose will be activated. A failure of the memory device may be detected automatically by means of a test circuit, and the spare memory device may be activated automatically upon detection of a failure. Preferably, all data entities previously stored in the failed memory device are reconstructed on the basis of the remaining data entities of the respective groups of data entities and the corresponding calculated parity entities. Instead of data entities there may have been stored parity entities on the failed memory device which entirety of parity entities may also be reconstructed on the basis of the data entities of the respective groups stored on the other memory devices.

Preferably, the reconstructed data entities which typically would have been stored on the spare memory device are now stored on another one of the remaining memory devices, this memory device also called first memory device in the present context. Preferably, one, some or all of the parity entity(ies) residing on this first memory device and associated with the same group of the reconstructed data entities are now relocated to the spare memory device.

The data entities lost by the failure of one of the memory devices may first be reconstructed e.g. by use of registers, then stored on the spare device, and afterwards be swapped with parity entities on the first memory device. Alternatively, after reconstruction the reconstructed data entities might immediately be stored on the first memory device without being stored on the spare memory device before. The relocation of the subject parity entities to the spare memory device might take place prior to storing the reconstructed data entities on the first device, or might take place after the reconstruction activities.

In a preferred embodiment of the method it includes striping data, wherein data entities belonging to the same group are split across several memory devices, calculating at least one parity entity for each group of data entities and storing said parity entity on a memory device, reconstructing all data entities of a failed memory device on a spare memory device of said data storage system, and relocating parity entities to the spare memory through a swap between data entities reconstructed on the spare memory device and parity entities stored on other memory devices of the data storage system.

As can be seen from FIG. 1 a data storage system 1 according to an embodiment of the present invention includes a storage subsystem controller 2 for controlling at least one solid state drive array 3. The solid state drive array 3 includes several memory devices or solid state drives 3-$i$ (SSDs). These memory devices 3-$i$ can be flash-based solid state drives (SSDs) or flash-based modules for storing user data. The memory devices of the solid state drive array 3 can include flash memory chips and/or phase change memory chips. The storage subsystem controller 2 is connected to the solid state drive array 3 via a control or data bus interface 4 as shown in FIG. 1. In a possible embodiment the storage subsystem controller 2 and the solid state drive array 3 are integrated into the data storage system unit. In an alternative embodiment the storage subsystem controller 2 and the solid state drive array 3 can form separate units. In a possible embodiment the storage subsystem controller 2 forms part of a computer or server connected to a solid state drive array 3.

Figure 2:
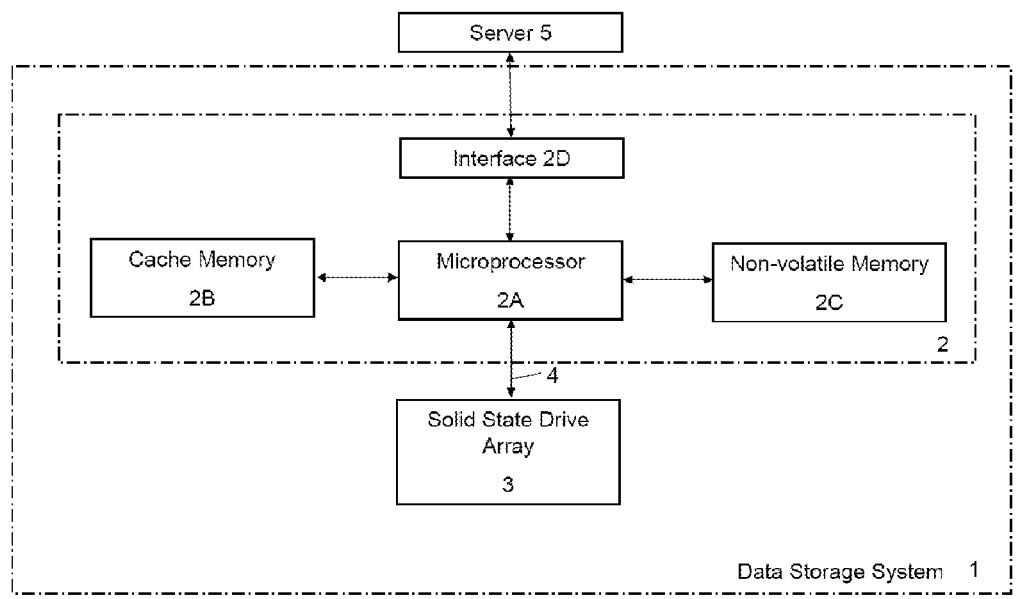
FIG. 2 shows a block diagram of an embodiment of a data storage system according to the present invention.

FIG. 2 shows the storage subsystem controller 2 of FIG. 1 in more detail. In the shown embodiment the storage subsystem controller 2 includes a microprocessor 2A having access to a cache memory 2B and a non-volatile memory 2C. Furthermore, an interface unit 2D is provided for exchanging data with the terminal or server 5. In the embodiment shown in FIG. 2 the microprocessor 2A can execute a program loaded from the non-volatile memory 2C which stores at least a computer program having instructions to perform a method according to the present invention. The cache memory 2B is provided for storing temporary data sent or received by the interface unit 2D. The wear leveling method can also be performed by a program of an operating system running on a computer connected to a solid state drive array 3.

The storage subsystem controller 2 as shown in FIG. 2 is adapted for performing a wear leveling of the memory devices or solid state drives within the solid state drive array 3 by relocating parity entities PE to at least one spare memory through a swap between data entities DE reconstructed on a spare memory after a failure of a memory device or solid state drive SSD and parity entities PE stored on other memory devices or solid state drives of the solid state drive array 3. The spare memory replaces a failed memory device of the solid state drive array 3. In another embodiment the spare memory is an additional memory installed in the solid state drive array 3 to expand the storage capacity of the array.

In an embodiment the relocation of parity entities PE to the spare memory is performed by the storage subsystem controller 2, if a predetermined relocation criterion is met. This relocation criterion can be a function of relative ages of memory devices or solid state drives SSDs of said data storage system 1 monitored by the storage subsystem controller 2.

In a possible embodiment the storage subsystem controller 2 includes for each memory device or each solid state drive SSD a corresponding age counter or register which is incremented upon each write operation on the respective memory device or solid state drive and calculates a relative age of the respective memory device or solid state drive SSD as a ratio of the age counter value and a predetermined life time expectancy value.

The storage subsystem controller 2 is adapted to progressively relocate a certain amount of parity sectors or parity entities PE from older memory devices or solid state drives to the newly installed spare memory device or solid state drive. Accordingly, the storage subsystem controller 2 employed by the data storage system 1 according to the present invention performs a dynamic wear leveling through floating parity placement.

Figure 3:
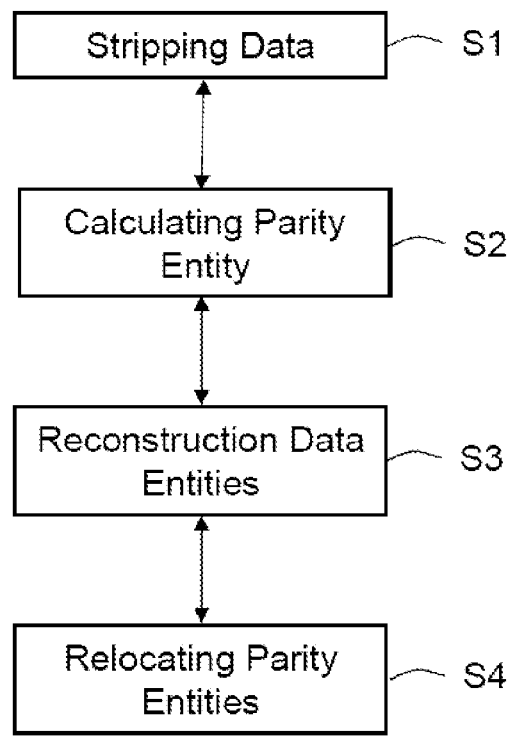
FIG. 3 shows a flow chart of a possible embodiment of a wear leveling method according to the present invention.

FIG. 3 shows a flow chart of a possible embodiment of a method according to the present invention.

In a first step S1 a striping of data is performed, wherein groups of data entities DE received from the computer or server 5 via the interface unit 2D are split across several memory devices or solid state drives 3-$i$ of the solid state drive array 3.

In a further step S2 at least one parity entity PE for each group of data entities DE or data blocks is calculated and the calculated parity entity is stored on a memory device or solid state drive of the solid state drive array 3. The parity entities PE may be distributed among all memory devices or solid state drives initially.

In a further step S3 all data entities DE and parity entities PE of a failed memory device or solid state drive of the solid state drive array 3 are reconstructed on a spare memory device or spare solid state drive SSD of the solid state drive array 3. This reconstruction in step S3 is performed on the basis of the remaining data entities DE of the respective groups of data entities and the corresponding calculated parity entities. In a possible embodiment a parity entity PE for a group of data entities DE is calculated by performing a bitwise XOR-operation on the data entities DE of the same group. In an another embodiment a parity entity PE for a group of data entities DE are calculated by performing a bitwise XOR-operations or Galois field operations on the data entities DE of the group of data entities DE.

In a further step S4, some parity entities PE are relocated to the least one newly installed spare memory through a swap between data entities DE reconstructed on the spare memory and parity entities PE stored on other older memory devices or solid state drives SSD of the data storage system 1.

In a possible embodiment the relocation of the parity entities in step S4 to that spare memory or spare solid state drive SSD is performed if at least one predetermined relocation criterion is met. In an embodiment of the wear leveling method according to the present invention this relocation criterion is formed by a function of relative ages of the memory devices or solid state drives SSDs of the data storage system 1. This relative age R of a memory device SSD or solid state drive can be calculated as a ratio between an age counter value ACV of a counter which is incremented upon each write operation on the respective memory device or solid state drive SSD and an expected life time value ELTV of the memory device or solid state drive R=ACV/ELTV. In a possible embodiment the expected life time value ELTV of all memory devices SSDs or solid state drive within the solid state drive array 3 is the same because the implemented solid state drives SSDs have the same expected life time. In an alternative embodiment the different solid state drives or memory device within the solid state drive array 3 can have different life time characteristics because of different design or previous use.

In a possible embodiment the method is performed when the wear out degree of a memory device or solid state drive SSD significantly exceeds that of the remaining ones. This, for instance, can be caused by a mix of memory devices or solid state drives SSDs with differing life time characteristics in the same array 3. In this case a portion of the parity sectors on a worn out older memory device is relocated on the remaining memory devices or solid state drives to relieve it from excess wear out.

In a possible embodiment a counter for each memory device 3-$i$ of said solid state drive array 3 is provided in the storage subsystem controller 2 for measuring and monitoring the overall number of erase operations or cycles performed with the respective memory device 3-$i$. When a memory device 3-$i$ of the array 3 fails its data content is rebuilt in a spare memory device or spare solid state drive SSD and the corresponding counter is reset to zero. Preferably, parity entities PE stored on the remaining memory devices of the solid state drive array 3 are subsequently relocated on the newly installed spare memory device through a swap between data entities DE rebuilt on the newly installed spare memory device and parity entities DE residing on the remaining memory devices. The amount of parity entities relocated from the remaining memory devices on the at least one newly installed spare memory device can depend on the number of parity entities PE located on the newly installed spare memory device as well as on the relative age counter values of all memory devices which are expressed by the ratio of the age counter value ACV to the corresponding expected life time value ELTV which can be configured in a possible embodiment via the interface unit 2D by a user on the basis of information given by the data specification provided by the memory device manufacturer.

The higher the ratio of the age counter value ACV to the corresponding expected life time value ELTV is, i.e. the higher the age of the respective memory device is, the larger is the amount of parity entities PE relocated away from it to the newly installed spare memory device. In a possible embodiment there can be also an upper limit on the amount or number of relocated parity sectors or parity entities PE. In this case it can happen that more or all parity sectors or parity entities PE are placed on the newly installed spare memory device after relocation. This has the advantage that a performance bottleneck can be avoided.

In a possible embodiment the relocation of parity sectors or parity entities PE not only is performed when a memory device or solid state drive SSD of the solid state drive array 3 fails and a newly installed memory device is used but also when at some point in time the age, i.e. the ratio of the age counter value ACV to the corresponding expected life time value ELTV of the respective memory device exceeds by an adjustable threshold the age of the next memory device in sequence. In this case a portion of the parity sector stored on this oldest memory device is relocated on the remaining memory devices or solid state drives SSDs according to the relative age derived by the corresponding age counters.

Figure 4:
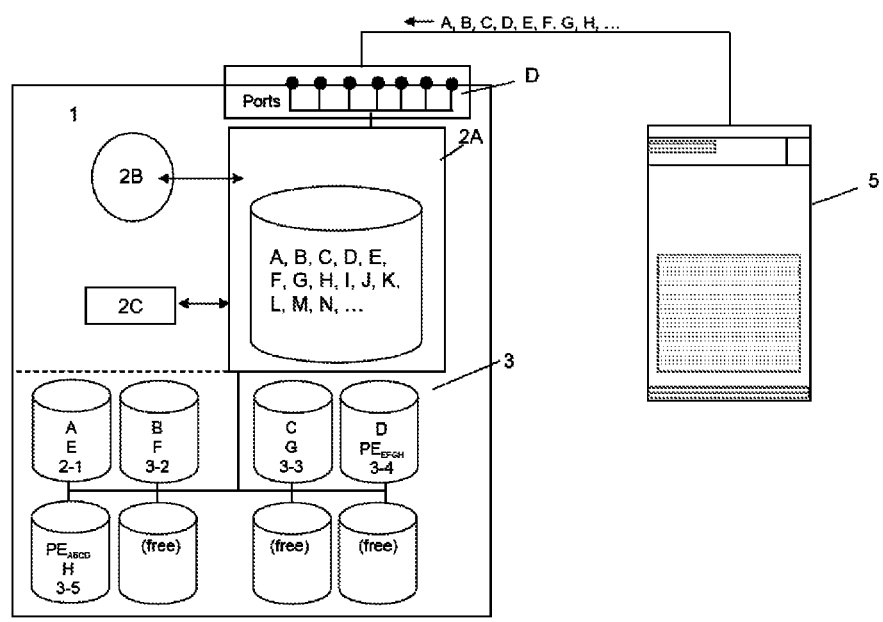
FIG. 4 shows a further diagram for illustrating the wear leveling method according to the present invention.

FIG. 4 shows a diagram for illustrating the wear leveling method according to the present invention. A computer or user of a server 5 can supply a data storage system 1 according to the present invention with data entities DE or data blocks A, B, C, D, E, F, G, H as shown in FIG. 4. The storage subsystem controller 2 having for example a microprocessor 2A distributes these data blocks over physical memory devices 3-$i$ or solid state drives SSDs within the solid state drive array 3 as shown in FIG. 4. From the point of view of the server 5, there is one virtual storage device including all data blocks or data entities A-H as shown in FIG. 4. In the given example a parity entity PE for a group of four data entities such as data blocks A, B, C, D or data blocks E, F, G, H is calculated by performing a bitwise XOR-operation or Galois field operation on the data entities of the expected group of data entities DE and the calculated parity entities $PE_{ABCD}$ and $PE_{EFGH}$ are also distributed over different solid state drives SSDs of the solid state drive array 3 as shown in FIG. 4. When a solid state drive SSD of the solid state drive array 3 fails such as for example the solid state drive 3-$i$ containing data blocks A, E the lost data is reconstructed by means of the remaining data blocks or data entities of the data block group and the calculated parity entity PE of the respective group. For example for reconstructing the data block A the data blocks B, C, D stored on other solid state drives SSDs and the calculated parity entity $PE_{ABCD}$ stored on a further solid state drive SSD are used to reconstruct the lost data block A. In the same manner, the data block E is reconstructed by using the data blocks F, G, H and the parity entity $PE_{EFGH}$. In the present embodiment, after reconstruction of the data entities A, E in step S3 parity entities such as $PE_{ABCD}$ and $PE_{EFGH}$ are relocated to the newly installed memory device in which the reconstructed data A, E are stored through a swap of some or all of the stored reconstructed data entities A, E with some or all of the parity entities $PE_{ABCD}$, $PE_{EFGH}$ stored on other solid state drivers SSDs of the solid state drive array 3. For example, in the method according to the present invention the parity entity $PE_{ABCD}$ of the fifth solid state drive 3-5 might be swapped with the reconstructed data block A stored in the first solid state 3-1. Accordingly, in this example the frequently updated parity entity $PE_{ABCD}$ is placed on the fresh newly implemented spare memory device 3-1 for relieving the older remaining memory device 3-5 reducing its rate of wear out and therefore improving the reliability and increasing the life time of the entire data storage system 1.

The method according to the present invention can be used for any kind of data storage system having memory devices where a wear out can occur. The size or capacity of the respective memory devices 3-$i$ can vary. Further, it is possible that different memory devices of different design and life expectancy are used in the same solid sate drive array 3 of the data storage system 1 according to the present invention.

In a possible embodiment the life time expectancy value counters can be configured via an interface.

In a possible embodiment the storage subsystem controller 2 can read this configuration life time expectancy value directly from a reserved storage location of the respective memory device or solid state drive SSD.

In a possible embodiment the age i.e. the ratio of the age counter value ACV and the expected life time value ELTV can be indicated, e.g. on a display, to a user or operator showing the wear out of the different memory devices 3-$i$ in the data store system 1.

In a possible embodiment the method according to the present invention is triggered to be executed when a failed memory device 3-$i$ is replaced by a spare memory device.

In an alternative embodiment the method according to the present invention is triggered to be executed when the relative age of a memory device 3-$i$ significantly exceeds the age of other memory devices 3-$i$ within the data storage system 1.

In a further embodiment the method according to the present invention is triggered by an input of an operator or user if the displayed ratio between the age counter value ACV and the expected life time value ELTV shows that a memory device 3-$i$ has an age which significantly exceeds the age of other memory devices 3-$i$ in the same data storage system 1.

In possible embodiments other events can trigger the method to be executed, e.g. adding a memory device or solid state drive, starting operation to the array 3 or starting and booting the system as well as connecting a device or computer to the data storage system 1.

The relocation of parity entities PE can be performed during operation of the system for example during idle operation times. In a possible embodiment also the replacement of failed memory devices can be performed during of the operation of the data storage system 1. The method and system according to the present invention significantly increases the expected life time or operation time of the employed memory devices or solid state drives SSDs by leveling the wear out of the respective memory devices. Accordingly, the reliability of the entire data storage system 1 is increased.

The invention further provides a method for operating memory devices or solid state drives SSD of a RAID-(Redundant Array of Inexpensive Disks)-protected data storage system 1 including relocating frequently updated parity entities from a first memory device 3-$i$ having a high ratio of write operations to an expected lifetime value to a second memory device 3-$j$ having a low ratio of write operation to an expected life time value.

In a possible embodiment the second memory device 3-$j$ is formed by a newly installed spare memory device.

The wear leveling method according to the present invention may be initiated when an event occurs. This event can include that the ratio of write operations of the expected life time value of the first memory device 3-$i$ exceeds a predetermined threshold. In a possible embodiment a trigger event may be that a memory device within a memory device array is replaced or added. In a further possible embodiment the event is formed by reception of an instruction to initiate wear leveling. In a further possible embodiment the event is that the data storage system is started or one or several memory devices are connected to the data storage system.

The invention claimed is:

1. A method for operating memory devices of a data storage system, the method comprising:
relocating one or more parity entities (PE) from a first memory device to a spare memory device replacing a failed memory device, wherein one or more of the memory devices is a Solid State Drive (SSD); and
storing one or more reconstructed data entities (DE) on the first memory device.

2. The method according to claim 1, wherein said relocating of said one or more parity entities (PE) to said spare memory device is performed if at least one predetermined relocation criterion is met.

3. The method according to claim 2, wherein said relocation criterion takes into account a relative age of one or more of the memory devices of said data storage system, said relative age of a memory device being calculated as a ratio between an age counter value (ACV) which is incremented upon each write operation on the respective memory device and an expected lifetime value (ELTV) of said memory device.

4. The method according to claim 3,
wherein data to be stored on said data storage system is split into groups of data entities (DE), and wherein data entities (DE) belonging to the same group are stored on different memory devices of said data storage system.

5. The method according to claim 4, wherein at least one parity entity (PE) is calculated for each group of data entities (DE) and is stored on a memory device other than the memory devices the data entities (DE) of the same group are stored on.

6. The method according to claim 4, wherein the one or more data entities (DE) stored on the failed memory device are reconstructed on the basis of the remaining data entities (DE) of the respective group of data entities (DE) and the corresponding calculated parity entity (PE) of said group.

7. The method according to claim 5, wherein the parity entity (PE) for a group of data entities (DE) is calculated by performing a bitwise XOR-operation on the data entities (DE) of said group of data entities.

8. The method according to claim 5, wherein the parity entity (PE) for a group of data entities (DE) is calculated by performing Galois Field operations on the data entities (DE) of said group of data entities.

9. The method according to claim 1, wherein the one or more parity entities (PE) of the first memory device are relocated to the spare memory device by a swap with one or more of the reconstructed data entities (DE) stored on the spare memory device.

10. The method according to claim 1, wherein after reconstruction the one or more reconstructed data entities (DE) are directly stored on the first memory device.

11. A data storage system comprising:
a plurality of memory devices for storing data; and
a storage subsystem controller designed for operating said memory devices by relocating one or more parity entities (PE) from a first of said memory devices to a spare memory device replacing a failed of said memory devices, and for storing one or more reconstructed data entities on the first memory device, wherein one or more of the memory devices is a Solid State Drive (SSD).

12. The data storage system according to claim 11, wherein said memory devices comprise solid state drives.

13. The data storage system according to claim 11,
wherein said memory devices comprise flash memory chips.

14. The data storage system according to claim 11, wherein said memory devices comprise phase change memory chips.

15. A computer program product comprising a computer readable storage device having stored therein a computer program for operating memory devices of a data storage system stored therein, which, when executed by a data processing system, causes the data processing system to perform actions comprising:
relocating one or more parity entities (PE) from a first memory device to a spare memory device replacing a failed memory device, wherein one or more of the memory devices is a Solid State Drive (SSD); and
storing one or more reconstructed data entities (DE) on the first memory device.

16. The computer program product according to claim 15, wherein said relocating of said one or more parity entities (PE) to said spare memory device is performed if at least one predetermined relocation criterion is met.

17. The computer program product according to claim 16, wherein said relocation criterion takes into account a relative age of one or more of the memory devices of said data storage system, said relative age of a memory device being calculated as a ratio between an age counter value (ACV) which is incremented upon each write operation on the respective memory device and an expected lifetime value (ELTV) of said memory device.

18. The computer program product according to claim 17, wherein data to be stored on said data storage system is split into groups of data entities (DE), and wherein data entities (DE) belonging to the same group are stored on different memory devices of said data storage system.

19. The computer program product according to claim 18, wherein at least one parity entity (PE) is calculated for each group of data entities (DE) and is stored on a memory device other than the memory devices the data entities (DE) of the same group are stored on.

20. The computer program product according to claim 18, wherein the one or more data entities (DE) stored on the failed memory device are reconstructed on the basis of the remaining data entities (DE) of the respective group of data entities (DE) and the corresponding calculated parity entity (PE) of said group.

21. The computer program product according to claim 19, wherein the parity entity (PE) for a group of data entities (DE) is calculated by performing a bitwise XOR-operation on the data entities (DE) of said group of data entities.

22. The computer program product according to claim 19, wherein the parity entity (PE) for a group of data entities (DE) is calculated by performing Galois Field operations on the data entities (DE) of said group of data entities.

23. The computer program product according to claim 15, wherein the one or more parity entities (PE) of the first memory device are relocated to the spare memory device by a swap with one or more of the reconstructed data entities (DE) stored on the spare memory device.

24. The computer program product according to claim 15, wherein after reconstruction the one or more reconstructed data entities (DE) are directly stored on the first memory device.

* * * * *